(12) United States Patent
Locker et al.

(10) Patent No.: US 9,047,041 B2
(45) Date of Patent: *Jun. 2, 2015

(54) COMBINING MULTIPLE SLATE DISPLAYS INTO A LARGER DISPLAY MATRIX

(75) Inventors: Howard J. Locker, Cary, NC (US); David William Critchley, III, Raleigh, NC (US); Mika Majapuro, Chapel Hill, NC (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 1003 days.

This patent is subject to a terminal disclaimer.

(21) Appl. No.: 12/883,041

(22) Filed: Sep. 15, 2010

(65) Prior Publication Data

US 2012/0062442 A1   Mar. 15, 2012

(51) Int. Cl.
*G06F 3/14* (2006.01)
*G06F 3/147* (2006.01)

(52) U.S. Cl.
CPC .............. *G06F 3/1446* (2013.01); *G06F 3/147* (2013.01); *G09G 2340/0492* (2013.01); *G09G 2356/00* (2013.01)

(58) Field of Classification Search
CPC ............................................. G09G 2320/0261
USPC ......................................................... 345/1.3
See application file for complete search history.

(56) References Cited

U.S. PATENT DOCUMENTS

| | | | |
|---|---|---|---|
| 6,501,441 B1 * | 12/2002 | Ludtke et al. | 345/1.1 |
| 2005/0093768 A1 * | 5/2005 | Devos et al. | 345/1.3 |
| 2005/0168399 A1 | 8/2005 | Palmquist | |
| 2009/0160731 A1 * | 6/2009 | Schuler et al. | 345/1.1 |
| 2010/0053164 A1 * | 3/2010 | Imai et al. | 345/427 |
| 2010/0060664 A1 * | 3/2010 | Kilpatrick et al. | 345/650 |
| 2010/0066667 A1 * | 3/2010 | MacDougall et al. | 345/156 |
| 2010/0128020 A1 * | 5/2010 | Oh et al. | 345/213 |

OTHER PUBLICATIONS

U.S. Appl. No. 12/882,891 Office Action, dated Jul. 19, 2013.
U.S. Appl. No. 12/882,891 Office Action, dated Jan. 17, 2014.
U.S. Appl. No. 12/882,891 Office Action, dated Oct. 6, 2014.

* cited by examiner

*Primary Examiner* — Gerald Johnson
(74) *Attorney, Agent, or Firm* — Kunzler Law Group

(57) ABSTRACT

An apparatus, system, and method are disclosed for automatically combining multiple displays on multiple portable electronic computer devices to form a larger display matrix. For each device, a first display configured to combine with additional displays of additional electronic devices to form a larger display from a matrix of the first display and the additional displays. A display orientation module automatically determines an orientation of the first display with respect to the one or more additional displays that form the larger display matrix. The display orientation module determines a location of the first display in the larger display matrix.

17 Claims, 10 Drawing Sheets

COMBINING MULTIPLE SLATE DISPLAYS INTO A LARGER DISPLAY MATRIX

FIELD

The subject matter disclosed herein relates to slate or tablet computers and more particularly relates to combining slate computers together to form a single display and user interface.

BACKGROUND

Description of the Related Art

Slate computers, also known as tablet computers or tablet PCs, are becoming more common due to their small size, easy portability, and simple user interface. Often slate devices integrate a touch screen interface so that input devices such as a keyboard or mouse become optional. The display for a slate is often configured on the same surface as the touch screen so that a user simply touches a portion of the display to input or manipulate data. In some instances a stylus or other tool may be used to control the touch screen interface. In the interest of minimizing weight and size, slates are often provided in a very slim design where the display and touch screen interface occupy an entire face of the device. Today slate-type devices also include devices such as cell phones, personal digital assistants ("PDAs"), and the like.

Slates typically operate similar to a normal personal computer or laptop in that various applications, operating systems, and interfaces, may be installed into memory and may be run by a processor on the slate. However, the very advantage provided by a slate computer, its small size and portability, can also limit its useful in situations where a larger display is needed or desired. Although some slates may be configured to connect to and output its display to a larger monitor or other device, a larger monitor or display is not always available.

BRIEF SUMMARY

Based on the foregoing discussion, the inventors have recognized a need for an apparatus, system, and method that enable the combination of multiple electronic computer devices, such as slate devices, to form one or more larger displays. Beneficially, such an apparatus, system, and method would enable a set of electronic computer devices with independent displays to be placed together such that each display forms a portion of a larger display and is configured to communicate with the other electronic computer devices in the set to create the larger display.

The embodiments of the present invention have been developed in response to the present state of the art, and in particular, in response to the problems and needs in the art that have not yet been fully solved by currently available slate computers and other slate types of devices. Accordingly, the embodiments have been developed to provide a method, apparatus, and system for combining slates together that overcome many or all of the above-discussed shortcomings in the art.

The apparatus to combine a set of slate computer devices together is provided with a plurality of modules including a display configuration module. In one embodiment, the apparatus is configured with a first display configured to combine with one or more additional displays of one or more additional electronic devices to form a larger display from a matrix of the first display and the plurality of additional displays. In a further embodiment, the apparatus may include a display orientation module that automatically determines an orientation of the first display with respect to the one or more additional displays that form the larger display matrix, the display orientation module determining a location of the first display in the larger display matrix. In one embodiment, the orientation module may determine a size and shape of the larger matrix.

In a further embodiment, the apparatus may include a detection module that automatically detects a presence of the one or more additional electronic computer devices and determines that the detected additional electronic computer devices are compatible with the first display to combine to form a larger display. In a further embodiment of the apparatus, the detection module may include one or more detection contact points, where the detection module detect the presence of one of the additional electronic computer devices in response to the detection contact points of the detection module contacting one or more detection contact points of the additional electronic computer device. In yet a further embodiment, the display orientation module may determine an orientation of the first display with regard to one or more of the additional displays based on the detection contact points.

In one embodiment of the apparatus, a control module may be provided that communicates with one or more of the additional electronic computer devices to control operation of the larger display. In a further embodiment, the control module identifies an electronic computer device as a display master, where the display master is the electronic computer device that controls the output of the larger display. The display master sends output display signals to each of the other electronic computer devices to form the larger display. In yet a further embodiment, the control module identifies a second electronic computing device as the display master in response to an input command and control of the larger display transfers to the second computing device in response to the input command.

In one embodiment, the first display and each additional display each comprise a touch screen interface. In a further embodiment, the touch screen interface of the first display and each of the additional displays combine to form a larger touch screen interface such that the first display and each additional display each provide a portion of the larger touch screen interface.

In another embodiment of the apparatus, the configuration module determines a number of additional displays to be used in the larger display and determines one or more potential screen configurations for forming the larger display based on the number of displays to be used in the larger display. In one embodiment, the first display is combined with two or more additional displays to form the larger display. In another embodiment, the first display is combined with three additional displays in a two by two matrix to form the larger display. In another embodiment, the first display is combined with eight additional displays in a three by three matrix to form the larger display. In yet another embodiment, the larger display formed by the combination of the first display and the one or more additional displays is controlled by an additional master electronic computer device that is not used to form the larger display, and a display of the master electronic computer device separately displays the same data displayed by the larger display.

In one embodiment, the apparatus may include one or more securing mechanisms that physically secure one or more edges of the first display to one or more edges of the additional displays A system is also presented to combine the displays of one or more electronic computer devices into a larger display. The system may be embodied using the modules and embodiments described above with regard to the apparatus. In particular, the system, in one embodiment, includes a first electronic computer device and one or more additional electronic computing devices. In one embodiment, the first electronic computer device includes a first display a first display configured to combine with one or more additional displays of one or more additional electronic devices to form a larger display from a matrix of the first display and the plurality of additional displays. The first electronic device may also include a display orientation module that automatically determines an orientation of the first display with respect to the one or more additional displays that form the larger display matrix, the display orientation module determining a location of the first display in the larger display matrix. In one embodiment, the first display is configured to provide a portion of the larger display. In a further embodiment, the first electronic computer device comprises a slate computer.

A method is also presented for combining the displays of one or more electronic computer devices into a larger display. The method in the disclosed embodiments substantially includes the steps necessary to carry out the functions presented above with respect to the operation of the described apparatus and system. In one embodiment, the method includes configuring a first display of an electronic computer device to combine with one or more additional displays of one or more additional electronic computer devices to form a larger display matrix. The first display may be configured to provide a portion of the larger display matrix.

The method also may include identifying an electronic computer device as a display master, wherein the display master is the electronic computer device that controls the output of the larger display. The display master may send output display signals to each of the other electronic computer devices. In yet a further embodiment, the method includes operating the larger display based on the output display signals from the display master.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
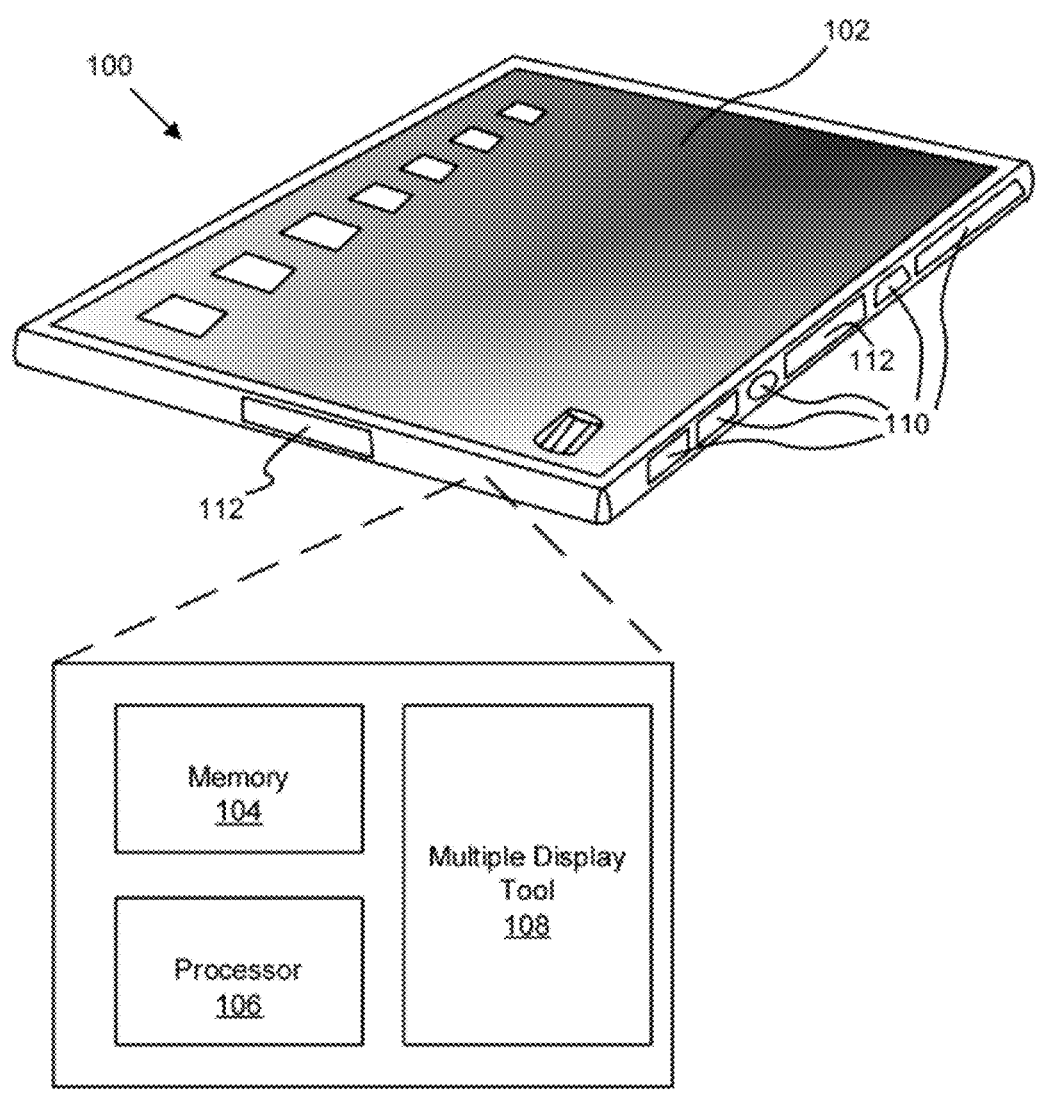
FIG. 1 is a schematic block diagram illustrating one embodiment of an electronic computer device in accordance with the present invention.

As will be appreciated by one skilled in the art, aspects of the embodiments may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable medium(s).

Any combination of one or more computer readable medium(s) may be utilized. The computer readable medium may be a computer readable signal medium or a computer readable storage medium. The computer readable medium may be a tangible computer readable storage medium storing the computer readable code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable program code embodied on a computer readable medium may be transmitted using any appropriate medium, including but not limited to wireless, wireline, optical fiber cable, RF, etc., or any suitable combination of the foregoing.

Computer readable program code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

An electronic computer device as used herein is an electronic device with independent computing power. An electronic computer device may include a processor and a memory that run applications and/or an operating system. Examples of electronic computer devices may include laptops, slate computers, tablet PCs, personal digital assistants ("PDAs"), cell phones, smart phones, and the like. As used herein, a slate device or slate computer or tablet PC refers to types of electronic computer devices that have an integrated display and may be operated without an independent keyboard device. Typically, a touch screen or other input device is used to operate a slate computer. Slate computers are commonly configured as slim, portable devices with a display that occupies one face of the device.

FIG. 1 is a schematic block diagram illustrating one embodiment of an electronic computer device 100 in accordance with the present invention. The electronic computer device in the depicted embodiment is a slate computer with a display 102, a memory 104, a processor 106, and a multiple display tool 108 in accordance with the present invention. In some embodiments described herein, the electronic computer device 100 is combined with one or more additional electronic computer devices to form a larger display, and each of the additional electronic computer devices may include the elements, modules, and embodiments described below with regard to the depicted electronic computer device 100.

In one embodiment, the display 102 is configured to occupy one face of the device 100. The display 102 may be configured as a touch-screen device that allows a user to input data, commands, and the like into the electronic computer device 100 by touching the screen with a finger, stylus, or other device. The display 102 receives output display data or an output display signal that causes depictions such as video, pictures, application interfaces, or the like to be displayed to a user.

The memory 104 may be configured as system memory of the electronic computer device 100, such as random access memory ("RAM"), or may be implemented as other types of memory such a hard-disk drive, flash memory, tape drive memory, or other forms of memory recognized by those of skill in the art. The memory 104 typically stores application data, operating system data, drivers, and the like for operating the electronic computer device 100. The processor 106 may be configured as microprocessor for processing computer instructions and the like as will be recognized by one of ordinary skill in the art.

The multiple display tool 108, in one embodiment, includes the modules, logic, and hardware necessary to enable the display 102 to be combined with other displays of like devices to form a larger display. For example, a group of users, each having an electronic computer device 100, may join together in a meeting and may desire to view a presentation or other data on their devices 100. The multiple display tool 108 enables the users to place their devices together, such as in a side by side formation on a flat table, so that the device displays 102 combine to form a larger display that can be viewed by all of the participants. In some cases, the devices 100 may automatically detect other devices and each device may be automatically configured to form the larger display. The multiple display tool 108 is discussed in detail below.

The electronic computer device 100, in various embodiments, may include additional components including ports 110 that serve as an interface between the electronic computer device 100 and other electronic devices and or peripheral devices. The ports 110 may be configured to receive a physical cable connection or to connect wirelessly to other devices using radio signals, infrared signals, magnetic signals, or the like. Examples of common ports 110 include USB ports, firewire ports, Ethernet ports, serial ports, parallel ports, PS/2 connectors, video graphics array connectors, digital visual interface connectors, SCSI connectors, power connectors, headphones (audio out), audio in, and the like. One or more ports may correspond to wireless devices such as wireless cards or the like for transmitting wireless signals to other devices. The electronic computer device 100, may also include various drivers, applications, graphics cards, or the like for processing and outputting a display signal from one electronic computer device 100 to additional electronic computer devices to form a larger display.

In one embodiment, the electronic computer device 100 may include one or more communication devices 112 that are configured to communicate directly with similar electronic computer devices to form a larger display by combining the displays 102 of the devices. The communication devices 112 may include sensors or communication devices such as infrared or radio signal devices for detecting and communicating with other devices. The communication devices 112 may be configured, in one embodiment, to utilize wireless personal area networks ("WPANs") to communicate with other electronic devices.

In one embodiment, the communication between communication devices 112 of different electronic devices may be initiated and facilitated by direct physical contact between the communication devices 112 of the different electronic devices. For example, touching the edges to two electronic devices together so that the communication devices 112 are touching, may facilitate communication between the devices. The multiple display tool 108, in one embodiment, controls operation of the communication devices 112 to facilitate connection to and communication between the electronic computer device 100 and other like devices. For example, the multiple display tool 108 may initiate "hand-shake" communications and then enable configuration data and video data to be passed between the electronic devices. In some embodiments, the communication devices 112 may simply be implemented as a sensor to determine if two compatible electronic devices are touching or are candidates for implementing a larger display. In such an embodiment, other communication ports 110 or communication mechanisms such wireless networks or WPANs may be used facilitate the passing of configuration data and video data between devices.

Figure 2:
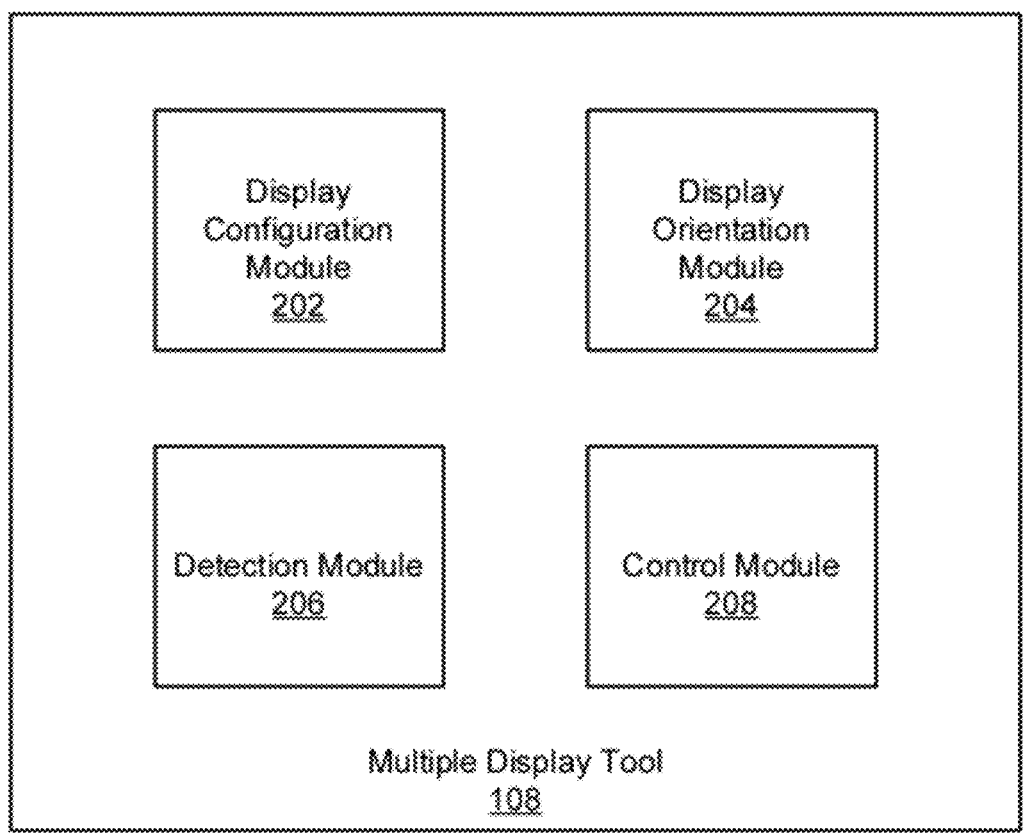
FIG. 2 is a schematic block diagram illustrating one embodiment of a multiple display tool in accordance with the present invention.

FIG. 2 is a schematic block diagram illustrating one embodiment of the multiple display tool 108 in accordance with the present invention. In the depicted embodiment, the multiple display tool 108 includes a display configuration module 108, a display orientation module 204, a detection module 206, and a control module 208. The modules of the multiple display tool 108 operate to facilitate configuration of an electronic computer device 100 to operate with other like devices to form a larger display. Although the modules and multiple display tool 108 are shown in regard to a first electronic computing device 100, it is contemplated that the multiple display tool 108 and its modules may be implemented on or across each device used to form the larger display. In one embodiment, each device is configured with its own multiple display tool 108 and corresponding modules.

The display configuration module 202, in one embodiment, configures the first display 102 to combine with one or more additional displays of one or more additional electronic computer devices to form a larger display. In such an embodiment, the first display 102 may be configured to provide a portion of the larger display. For example, the configuration module 202 may use a communication device 112 such as a WI-FI device to establish communications with one or more additional electronic computer devices. Once communications are established, the first electronic computer device 100 may be determine a number of displays 102 that will be used to form the larger image, and will determine the first display's position in among the other displays. In one embodiment, four displays may be configured to form two by two array to form the larger display, and the first display 102 may be configured as the top-left display in the array. Then, the display configuration module 202, in this example, may configure the first display 102 to depict the top-left portion of an image formed by the larger display.

In a further embodiment, the configuration module 202 may determine a number of additional displays to be used in the larger display and may determine one or more potential screen configurations for forming the larger display based on the number of displays to be used in the larger display. For example, if four displays are to be used to form the larger display, the configuration module 202 may determine that the screens may be configured in a two by two formation or in a one by four formation. In some embodiments, a default configuration for a number of displays may be used. For example, the configuration module 202 may automatically use a two by two configuration in response to determining that four displays are to be used in the array.

In another embodiment, the configuration module 202 may respond to user input wherein a user indicates a selected array formation and number of displays. In yet a further embodiment, the configuration module 202 may utilizes sensors or communication devices 112 that automatically detect an array type and position in the array based on physical contact with or wireless communication with other electronic devices. For example, bump sensors or connectors may be used to detect when the first device 100 is placed next to another device and the relative location of each device. The physical placement of electronic computer devices relative to one another may enable the devices to automatically determine a device's location relative to the other devices. Further, the devices may automatically determine, in some instances, an array or matrix size or dimension based on the physical touching or location of the various devices. For example, the communication mechanisms 112 may be placed in contact with one another, and the electronic computer device 300 may use the communication mechanisms 112 to determine where other devices are located (e.g. to the left, right, above). In this manner, the electronic computer device 300 may determine the portion of the larger display that is to be displayed by the first display 102.

In one embodiment, the configuration module 202 may determine based on where the electronic devices are contacting one another, or based on an orientation determined from signal direction, where the other devices are located in relation to the first electronic computer device 100. In this manner, the display configuration module 202 is able to configure the first display 102 to provide the correct portion of the larger display formed by the array of devices. In some embodiments, the configuration module 202 may also determine and implement display variables such screen size, display resolution, display brightness, and the like as recognized by one of skill in the art.

In one embodiment, an orientation module 204 may be provided to determine an orientation of the first display 102 with respect to the one or more additional displays that form the larger display. For example, determining an orientation of the first display 102 may include determining the first display's location in an array or matrix of displays. In further embodiments, determining an orientation of the first display 102 may also include determining an orientation of a screen of the first display 102 such as horizontal or vertical orientation. One of skill in the art will recognize that a display of a slate computer device 100 or the like can often be oriented (or viewed by the user) in either a horizontal or vertical fashion. In some instances, a sensor may automatically detect an orientation of the display 102 (such as when a user holds the display 102 in a certain direction) and the depiction on the screen may change to match the orientation of the display. In a further embodiment, the orientation module 204 may determine a size and/or shape of the matrix based on a number of devices used and their configured position relative to one another. In some cases, this may be done automatically based on communication between various electronic computing devices, such as via sensors, connectors, wireless communications or the like.

In some instances, the orientation module 204 may utilize user input to orient or re-orient a particular display. For example, a user may select an orientation for or change an orientation for a particular device. In a further embodiment, the orientation module 204 may be used orient or re-orient the larger display formed by a combination of devices. For example, suppose a group is sitting at a table such that the large display is upside down to part of the group. User input may be used to reverse the orientation so that the image turns right side up for the group. In another example, a group may be playing a video game on the larger display where each player takes a turn in the game in order around a table. The orientation module 204 may be configured to interface with an application to automatically adjust the orientation of the larger display to be right side up, for example, for the person whose turn it is in the game. In one embodiment, a user may be able to control the orientation of each display 102 and/or the larger display, and may be able to initiate rotation of the display image in increments such as 0, 90, 180, or 270 degrees.

The detection module 206, in one embodiment, automatically detects a presence of the one or more additional electronic computer devices and determines that the detected additional electronic computer devices are compatible with the first display to combine to form a larger display. In a further embodiment, the detection module 206 may include one or more detection contact points, wherein the detection module 206 detects the presence of one of the additional electronic computer devices in response to the detection contact points of the detection module contacting one or more detection contact points of the additional electronic computer device. See FIG. 3 and discussion below regarding detection contact points.

For example, the first electronic computer device 100 may be "bumped" with other devices, by touching their sides together or by making physical communication connections between the devices. The "bumping" may initiate communications with the configuration module 202 to configure the first display 102 to operate as part of a larger display. In one embodiment, the detection module 206 may operate with the orientation module 204 to determine an orientation of the first display 102 with regard to one or more of the additional displays based on the detection contact points.

In a further embodiment, the detection module 206 may respond to user input to initiate a search for compatible devices. For example, a user may input a command to use wireless communication to identify devices within range that are compatible with the first electronic computer device 100 to combine to form a larger display. In some instances, compatibility may mean that other electronic device includes the software and/or hardware necessary to operate the other electronic device to form the larger display. In one embodiment, compatibility factors may be defined such as device type, screen size, communication modes, and the like which may be used to determine a compatibility between two or more devices. For example, a user may initiate a search for touch screen slate computer devices with a 12-inch screen. In other embodiments, a search may be initiated automatically by the detection module 206. For example, the detection module 206 may continually scan for compatible devices and may notify a user in response to finding a compatible device.

The control module 208, in one embodiment, communicates with one or more of the additional electronic computer devices to control operation of the larger display. For example, the control module 208 may send video data for display to each of the additional electronic devices where the first electronic computer device 100 is assigned to control the image of the larger display formed by the combination of all the devices. Thus, one of the electronic computer devices, in this case the first electronic device 100, may act as the controller of the larger display, and the other devices may operate to receive an output video stream communicated from the device acting as the controller. Of course, in other embodiments, one of the additional electronic computer devices may be selected as the display master.

Thus, in one embodiment, the control module 208 identifies an electronic computer device as a display master, where the display master is the electronic computer device that controls the output of the larger display. The display master sends output display signals to each of the other electronic computer devices. In a further embodiment, the control module 208 arbitrates between each of the electronic devices that form the larger display, to select one of the electronic devices to act as the display master. For example, each electronic device 100 may communicate with the other devices to determine which device is to act as the display master. In yet a further embodiment, the control module 208 identifies electronic devices that are capable of acting as the display master (e.g. include the modules and hardware needed to act as display master) and arbitrates between the electronic devices to select on one of the devices as display master.

In a further embodiment, the control module 208 of the first electronic computer device 100 identifies a second electronic computing device as the display master in response to an input command. In this instance, control of the larger display transfers to the second computing device in response to the input command. For example, a first electronic device may be initially selected to control the video displayed on the larger display formed by the devices, but it may be necessary or desirable to change control to another of the devices. As a practical example, a group of users may each give a presentation to the others in the group using a larger display formed devices belonging respectively to the members of the group. Each user may utilize his own device to give a presentation, an in doing so, control of the larger display may be passed from device to device as the presentations are given.

In one embodiment, the control module 208 may include a default setting to automatically select a display master. For example, the control module 208 may identify the electronic computer device with the most processing power or the most memory as the display master. In another embodiment, the control module 208 may respond to user input to select a display master. For example, a default setting might include assigning the top-left most display as the display master or assigning the first to join as the display master. A user selected display master may include a user identifying a display master by touching the screen of the display master after communication between the devices from the larger display has been established.

Figure 3:
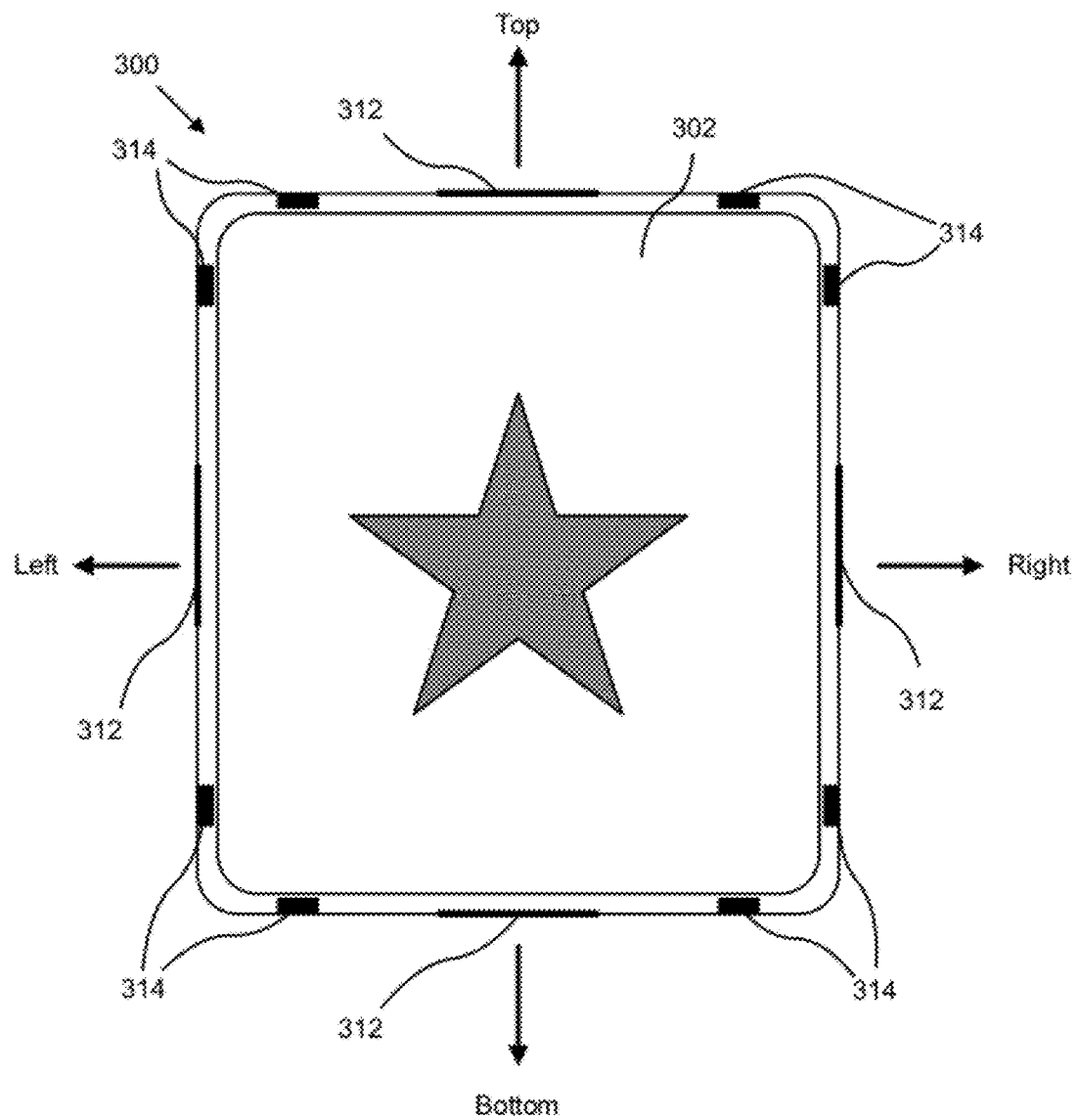
FIG. 3 is a schematic block diagram illustrating one embodiment of an electronic computer device in accordance with the present invention.

FIG. 3 is a schematic block diagram illustrating another embodiment of an electronic computer device 300 in accordance with the present invention. The electronic computer device 300 includes a touch screen display 302 that includes sensors for detecting touches or deformations of the display screen. The touch screen is configured to provide input data and commands to the electronic computer device 300. In the depicted embodiment, the touch screen display 302 is configured to be compatible with other like devices to combine to form a larger touch screen interface as will be discussed below. Orientation directions are shown indicating how the device is oriented in this embodiment, including a top, bottom, left, and right side. Of course, in other embodiments, the device 300 may be oriented differently, for example horizontally instead of vertically.

The electronic computer device 300, in the depicted embodiment, includes communication devices 312 for communicating with other electronic devices to form a larger display by combining the displays of the devices together. As noted above, The communication devices 112 may include sensors or communication devices such as infrared or radio signal devices for detecting and communicating with other devices. The communication devices 112 may be configured, in one embodiment, to utilize wireless personal area networks ("WPANs"), or other communication protocols, to communicate with other electronic devices. In one embodiment, the communication devices 312, may be configured to detect a physical touching of other devices, or to use near field communications ("NFC") or radio frequency identification ("RFID") to detect a near proximity of other devices. In some embodiments, the communication devices 312 may further include communication abilities for forming a WPAN or connecting to a WAN or local area network ("LAN"). In other embodiments, the communication devices 312 may be used to facilitate detection of other devices and to identify locations in the array for the larger display, where other network devices or communication ports handle the passing of data and information between the devices.

The multiple display tool 108, in one embodiment, controls operation of the communication devices 112 to facilitate connection to and communication between the electronic computer device 300 and other like devices. For example, the multiple display tool 108 may initiate "hand-shake" communications and then enable configuration data and video data to be passed between the electronic devices.

In the depicted embodiment, the electronic computer device 300 includes detection contact points 314 that detect the presence of other electronic computer devices in response to the detection contact points contacting one or more detection contact points of the other devices. In the depicted embodiment, two detection contact points 314 are provided on each edge of the device. In one embodiment, the detection contact points 314 are configured to line up with detection contact points of like devices when placed side by side. Of course, in other embodiments, the more or fewer detection contact points may be used and the detection contact points may be place in different locations and configurations. In one embodiment, the detection contact points 314, comprise RFID or NFC sensors. IN other embodiments, the detection contact points 314, may comprise buttons switches or the like that are triggered when contacting another surface. In various embodiments, the detection contact points 314 may include sensors, communication devices, communication ports, physical or wireless data connections, or the like.

In operation, when the first electronic computer device 300 is placed next to or touching a like device, the detection contact points 314 operate to detect the other device's presence and to initiate communications with the other device. In some embodiments, communication may occur between or through connections made by the detection contact points 314. The detection contact points 314 may indicate an orientation of the first electronic computer device 300 to other devices in an array forming a larger display. A detection module 206 may utilize the detection contact points 314 to identify other devices that are compatible for use with the multiple display tool 108 to form a larger display. An orientation module 204 may utilize the detection contact points to determine another device position and orientation with respect to the first electronic computer device 300.

For example, two users may desire to combine their devices to form a large display that they both can view simultaneously. The users may place their devices 300 side by side so that the detection contact points are touching or are in close proximity (assuming wireless or other sensors). Once placed side by side, the configuration module 202 of the first electronic computer device 300 may receive information from the detection module 306 and orientation module 304 indicating the presence and compatibility of the second device with the first device 300 and indicating an orientation of the first device 300 with respect to the second device. Then, the configuration module 202 may configure the first device 300 to display half of a larger display formed by the two devices.

In some embodiments, when the first display 302 is combined with other displays to form a large display, the first touch screen 302 may also be combined with the touch screens of the other devices to form a larger touch screen interface. In one embodiment, the touch screen interface of the first display 302 and each of the additional displays combine to form a larger touch screen interface such that the first display and each additional display each provide a portion of the larger touch screen interface. The communication ports 110 or communication devices 112 may be configured, in such embodiments, to facilitate communication of touch screen input data between the electronic computer devices of the array. Similar to the configuration of the display, a master device may be selected for controlling operation of the touch screen array.

Figure 4:
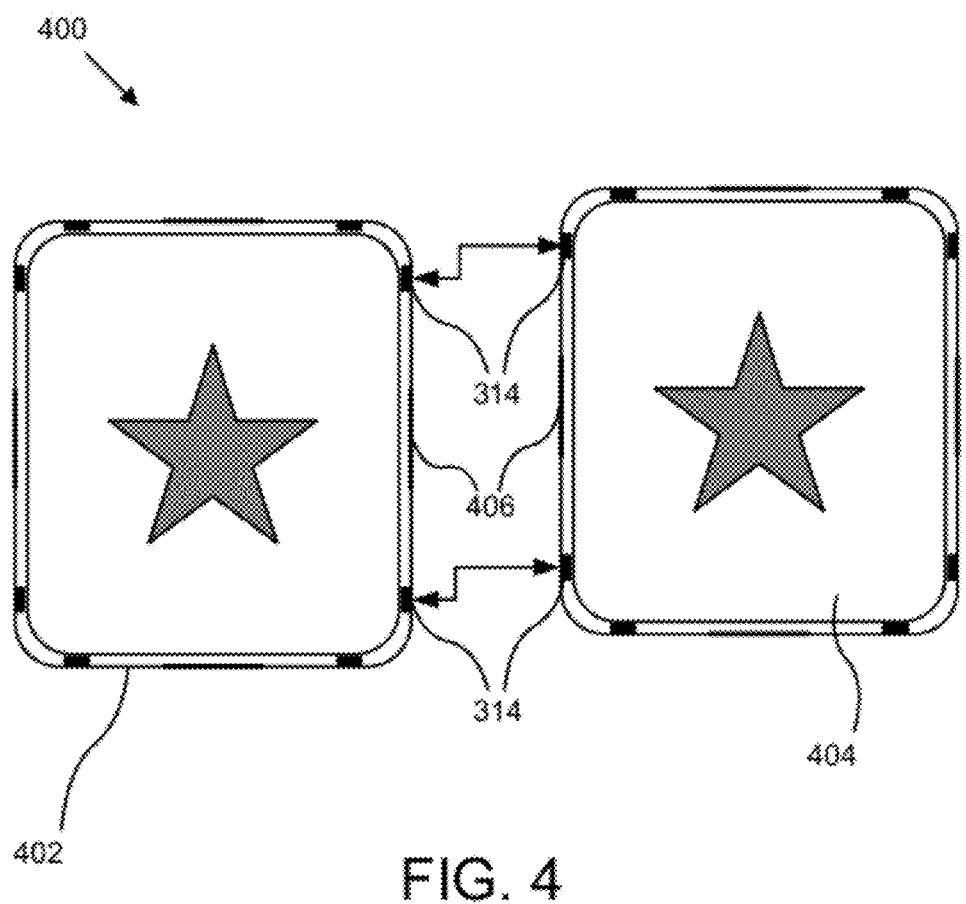
FIG. 4 is a schematic block diagram illustrating one embodiment of a system with two electronic computer devices with contact points.

FIG. 4 is a schematic block diagram illustrating one embodiment of a system 400 with two electronic computer devices 402 and 404 with detection contact points for initiating configuration of a larger display formed from the two devices 402 and 404. As depicted the detection contact points 314 of the two electronic devices 402 and 404 are placed together. The detection contact points 314 are used by each device 402 and 404 to detect the presence of the other device 402 and 404 and the orientation of the other device 402 and 404.

In one embodiment, one or more securing mechanisms 406 that physically secure one or more edges of the first display 402 to one or more edges of the additional display(s) 404 may be provided. In various embodiments, the securing mechanisms 406 may include electronic connectors, magnets, Velcro, male/female connectors, or the like as recognized by those of skill in the art. In some embodiments, the securing mechanisms may be integrated with the detection contact points 314. For example, in one embodiment, connecting an male adapter of a first device 402 with a female adapter of a second device 404 may also facilitate communication through the adapter such as through electrical contacts and connections.

Thus, in the depicted embodiment, the detection contact points 314 may indicate that the first device 402 is on the left side and the second device 404 is on the right side and the devices are oriented vertically. Once the configuration modules 202 of each respective device 402 and 404 establish communication, one acts as the display master and takes control of the larger display formed by the two devices 402 and 404. In the depicted embodiment, before reconfiguration, each device 402 and 404 includes its own independent display, shown as a star.

Figure 5:
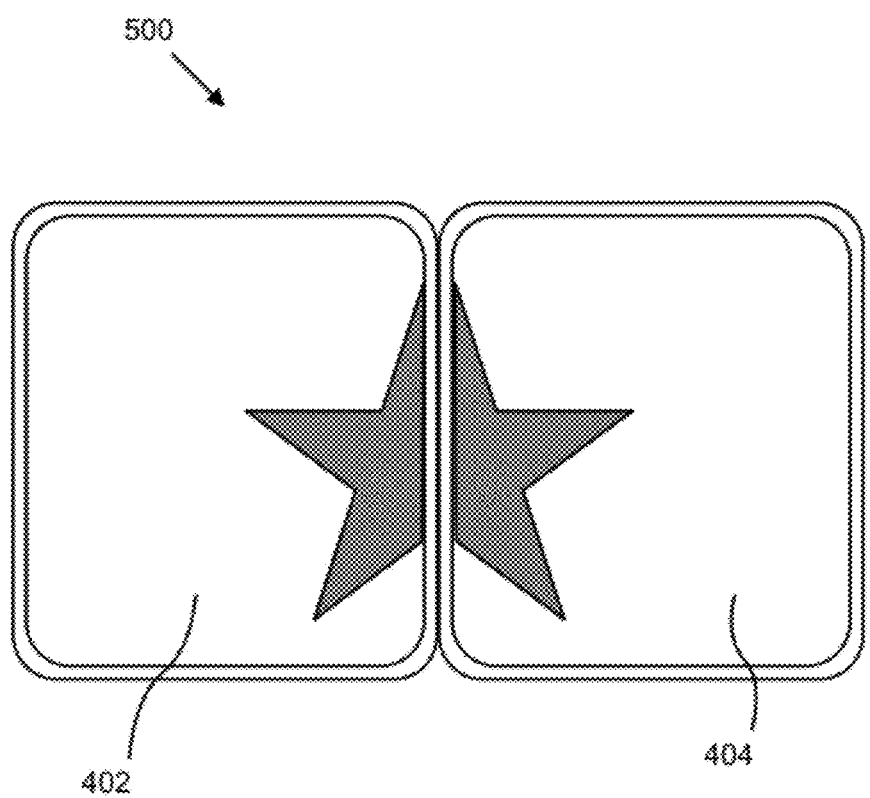
FIG. 5 is a schematic block diagram illustrating one embodiment of a display configuration for two electronic computer devices.

FIG. 5 depicts a display configuration 500 for the two electronic computer devices 402 and 404. As depicted in FIG. 5, the image of the first electronic computer device 402 is now shown on the combined display of the first and second devices 402 and 404.

Figure 6:
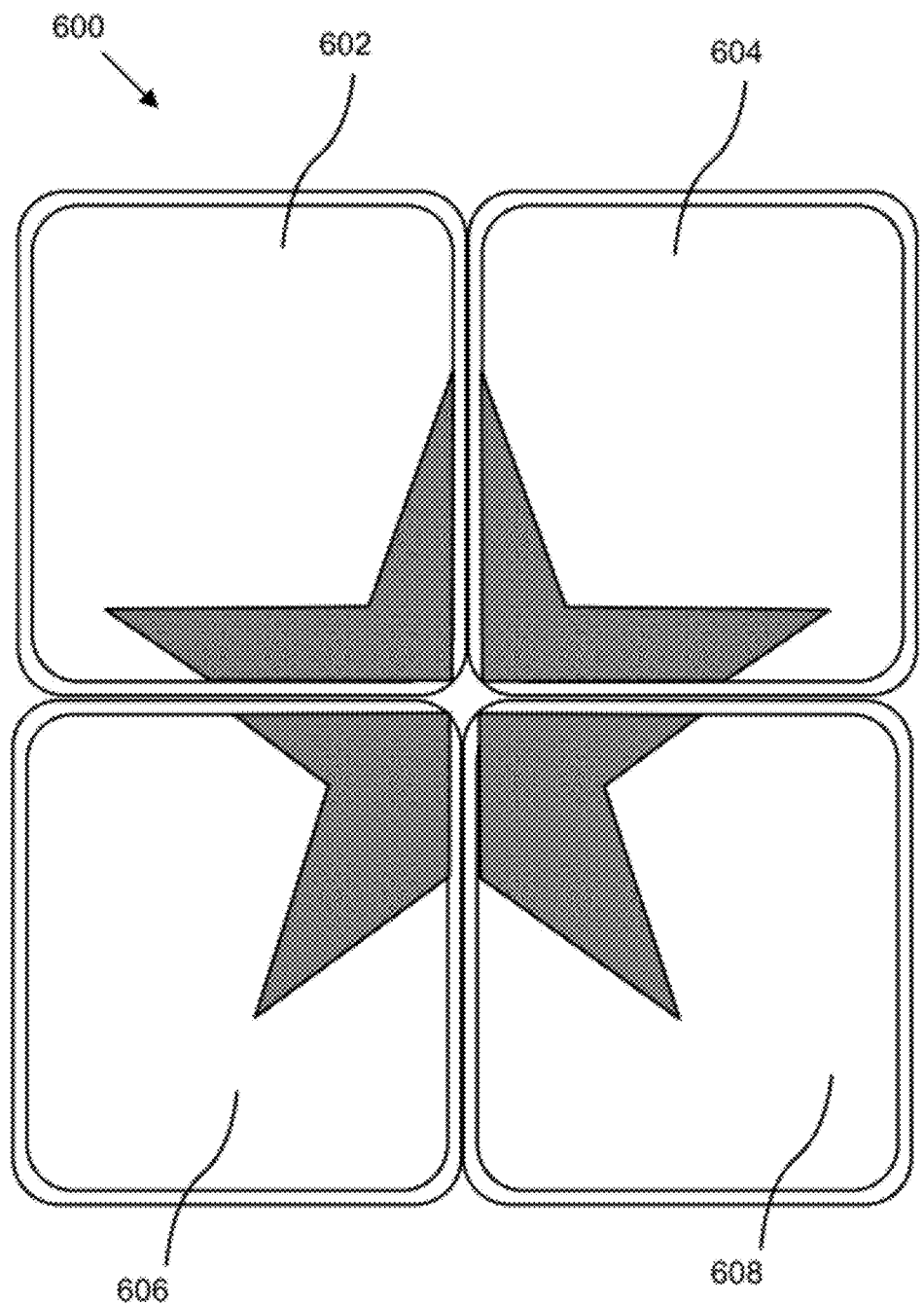
FIG. 6 is a schematic block diagram illustrating one embodiment of a display configuration for four electronic computer devices.

FIGS. 6-9 show various display configurations for different numbers of electronic computer devices and different orientations and arrays of the devices. The different configuration and orientations are provided as examples, and additional configuration and orientations are contemplated herein. FIG. 6 is a schematic block diagram illustrating one embodiment of a display configuration 600 for four electronic computer devices 602, 604, 606, and 608. In the depicted embodiment, a first display 602 is combined with three additional displays 604, 606, and 608 to form the larger display. In this instance, the larger display 600 is formed when the first display 602 and the three additional displays 604, 606, and 608 are combined in two by two matrix or array to form the larger display.

Figure 7:
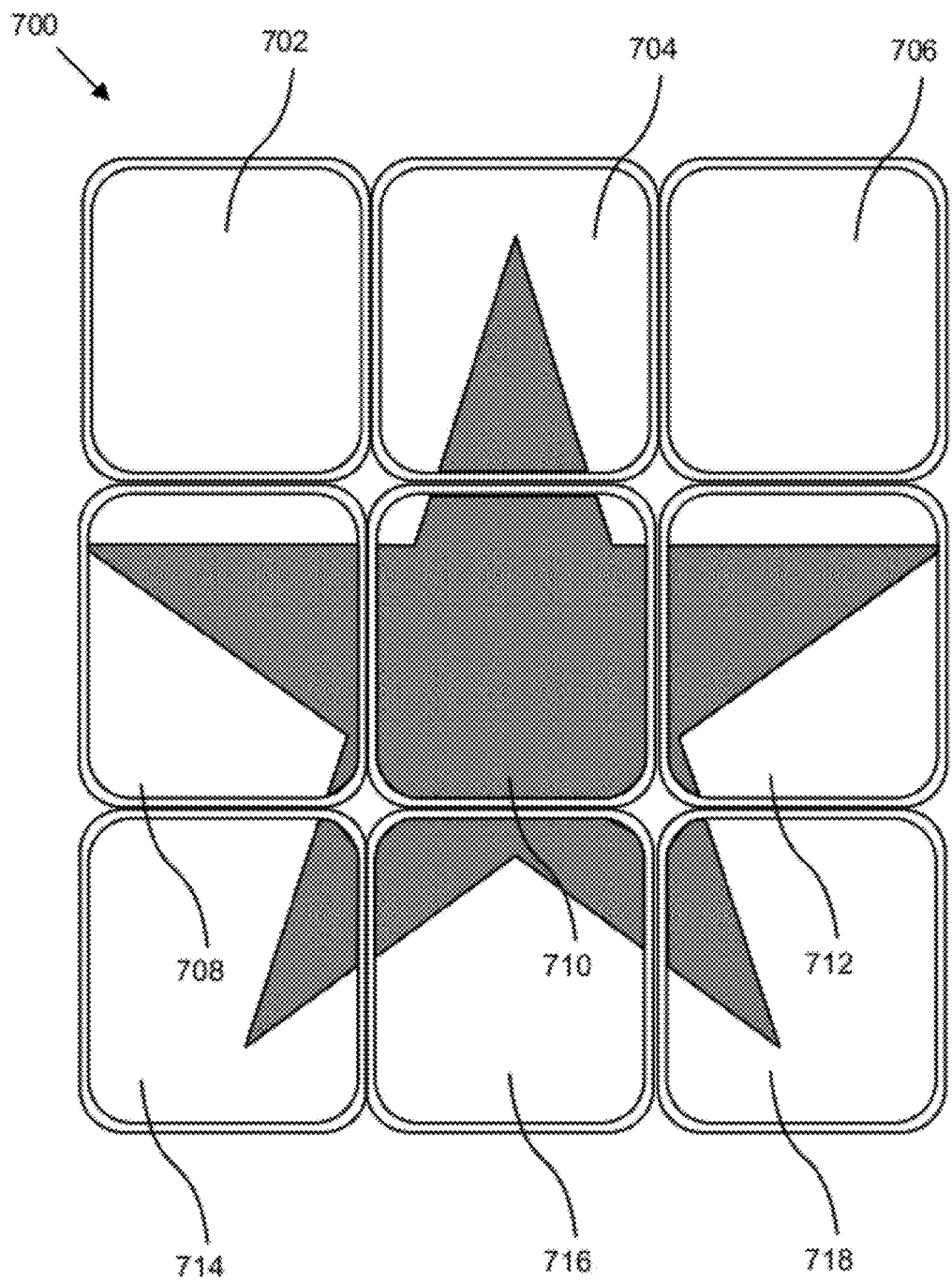
FIG. 7 is a schematic block diagram illustrating one embodiment of a display configuration for nine electronic computer devices.

FIG. 7 is a schematic block diagram illustrating one embodiment of a display configuration 700 for nine electronic computer devices 702-718. In the depicted embodiment, the first display 702 is combined with eight additional displays 704-718 in a three by three matrix to form the larger display. Each of the displays 702-718 provides $\frac{1}{9}^{th}$ of the display. In one embodiment, each of the nine devices associated with the nine displays 702-718 may include detection contact points 314 around the edges of each device. For example, in a three by three matrix, the middle device 710 is able determine that it is the middle device because it has communication with its detection contact points 314 on every side. Conversely, the first device 702 has is contacting another device on its right side and bottom side. Thus, it can determine that it is the top left device in the matrix.

Figure 8:
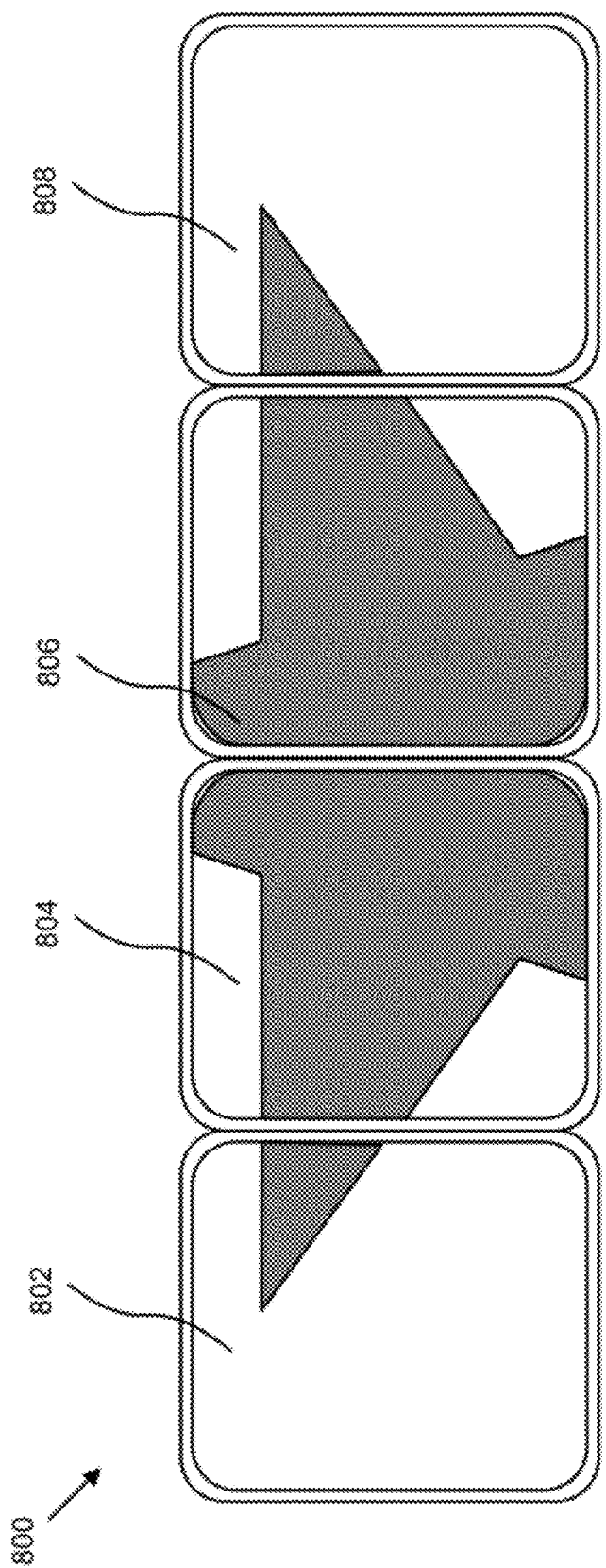
FIG. 8 is a schematic block diagram illustrating one embodiment of a display configuration for four electronic computer devices.

FIG. 8 is a schematic block diagram illustrating another embodiment of a display configuration 800 for four electronic computer devices. In this embodiment, the four devices 802-808 are arranged in a one by four matrix. In the depicted embodiment, the four devices form a snapshot view of the larger image of the star. For example, the larger image may be scrolled up or down to view the entire image. In other embodiments, the devices 802-808 may be configured to provide stretch the image to fit the display as configured or to provide two larger displays, each larger display formed by a combination of two of the devices 802-808 in the array.

Figure 9:
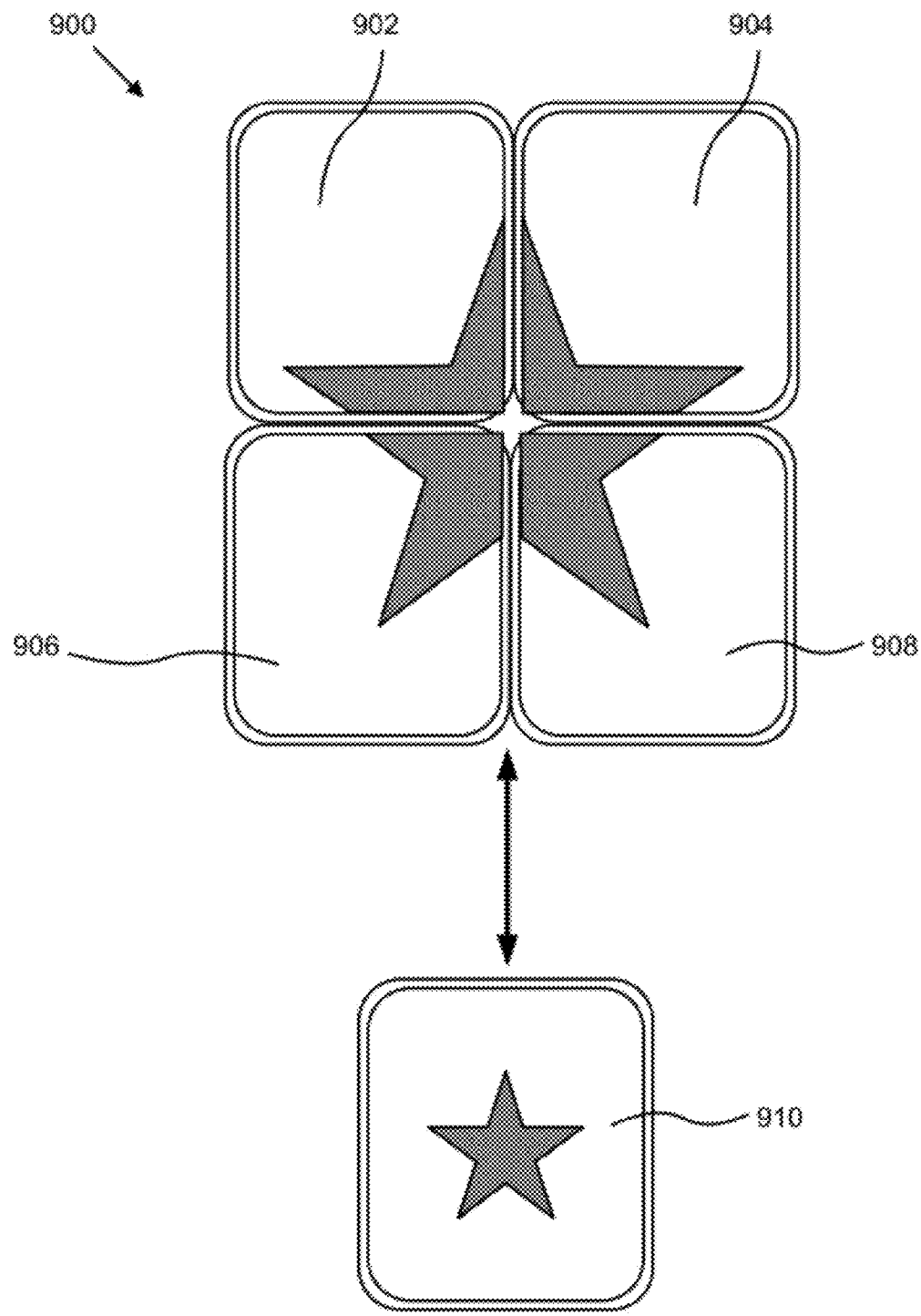
FIG. 9 is a schematic block diagram illustrating one embodiment of a display configuration for five electronic computer devices with a master electronic computer device.

FIG. 9 is a schematic block diagram illustrating one embodiment of a display configuration 9 for five electronic computer devices 902-910 with a master electronic computer device 910. In this embodiment, the larger display formed by the combination of the first display 902 and the three additional displays 904-908 is controlled by an additional master electronic computer device 910 that is not used to form the larger display. In one embodiment, a display of the master electronic computer device 910 separately displays the same data displayed by the larger display. In a practical example, a first user may give a presentation to a group of other users by using his own display, for example at the front of a room, with a group of users sitting around a table where the larger display formed from the other devices 902-908 is formed.

Figure 10:
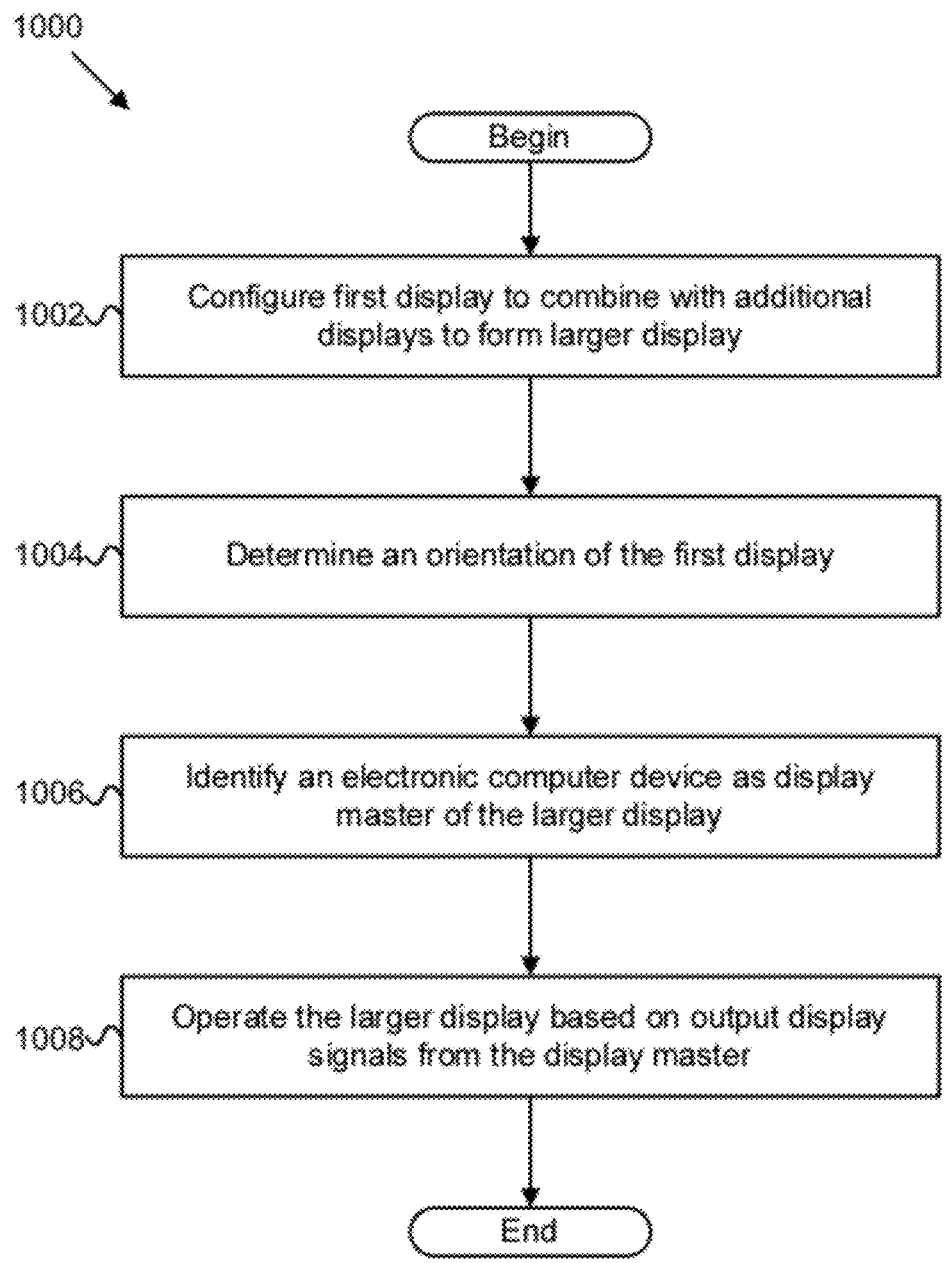
FIG. 10 is a schematic flow chart diagram illustrating one embodiment of a method for combing the displays of two or more electronic computer devices to form a larger display.

FIG. 10 is a schematic flow chart diagram illustrating one embodiment of a method 1000 for combing the displays of two or more electronic computer devices 402 and 404 to form a larger display. The method 1000 includes the modules, embodiments, and examples described above with regard to FIGS. 1-9.

The method 1000 begins when a configuration module 202 configures 1002 a first display 102 of an electronic computer device 402 to combine with one or more additional displays of one or more additional electronic computer devices 404 to form a larger display. In one embodiment, the first display 102 is configured to provide a portion of the larger display. In a further embodiment, a detection module 206 may automatically detect the presence of the one or more additional electronic computer devices 404 and may determine that the detected additional electronic computer devices 404 are compatible with the first display 102 to combine to form a larger display.

In one embodiment, a detection module 206 may detect the presence of additional electronic computer devices 404 that are compatible with the first display 102 to combine to form the larger display. In some instance, the detection module 206 may detect a number of additional devices 404 to be used in the larger display and may detect an array configuration of the devices 402 and 404 that form the larger display. In a further embodiment, the detection module 206 may detect a location in the array of the first electronic computer device 402 relative to the additional devices 404 based on sensors such as the communication devices 312 and detection contact points 314 described above.

In one embodiment, an orientation module 204 determines 1004 an orientation of the first display 102 with respect to the one or more additional displays to form the larger display. The orientation module 204 may communicate with the detection module 206 to determine an orientation of the first electronic computer device 402 relative to the other devices. The determined orientation may determine how an image is displayed on the display of the firs electronic computer device 402, such as the portion of the larger image to be displayed and its orientation relative the other displays.

A control module 208 identifies 1006 an electronic computer device 100 as a display master, wherein the display master is the electronic computer device 100 that controls the output of the larger display. In one embodiment, the display master sends output display signals to each of the other electronic computer devices 404. The display master operates 1008 the larger display by sending output display signals to the other devices 404.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electronic computer device comprising:
a first display configured to combine with one or more additional displays of one or more additional electronic devices to form a larger display from a matrix of the first display and the plurality of additional displays;
a display orientation module that automatically determines an orientation of the first display with respect to the one or more additional displays that form the larger display matrix and adjusts an orientation of the larger display matrix relative to a user in response to user input through a software application designed for joint operation by multiple users, the display orientation module determining a location of the first display in the larger display matrix; and
a control module that
communicates with one or more of the additional electronic computer devices to control operation of the larger display matrix; and
in response to an input command, transfers control of the larger display matrix from a first electronic computer device serving as a display master to a second electronic computer device, the second electronic computer device becoming the display master.

2. The electronic computer device of claim 1, wherein the orientation module further determines a size and shape of the larger display matrix.

3. The electronic computer device of claim 1, further comprising a detection module that automatically detects a presence of the one or more additional electronic computer devices and determines that the detected additional electronic computer devices are compatible with the first display to combine to form a larger display matrix.

4. The electronic computer device of claim 3, wherein the detection module comprises one or more detection contact points, wherein the detection module detects the presence of one of the additional electronic computer devices in response to the detection contact points of the detection module contacting one or more detection contact points of the additional electronic computer device.

5. The electronic computer device of claim 1, wherein the first display and each additional display each comprise a touch screen interface.

6. The electronic computer device of claim 5, wherein the touch screen interface of the first display and each of the additional displays combine to form a larger touch screen interface such that the first display and each additional display each provide a portion of the larger touch screen interface.

7. The electronic computer device of claim 1, wherein the display configuration module determines a number of additional displays to be used in the larger display matrix and determines one or more potential screen configurations for forming the larger display matrix based on the number of displays to be used in the larger display matrix.

8. The electronic computer device of claim 1, wherein the first display is configured to be combined with two or more additional displays to form the larger display matrix.

9. The electronic computer device of claim 1, wherein the first display is configured to be combined with three additional displays in a two by two matrix to form the larger display matrix.

10. The electronic computer device of claim 1, wherein the first display is configured to be combined with eight additional displays in a three by three matrix to form the larger display matrix.

11. The electronic computer device of claim 1, wherein the larger display matrix formed by the combination of the first display and the one or more additional displays is controlled by an additional master electronic computer device that is not used to form the larger display matrix, wherein a display of the master electronic computer device separately displays the same data displayed by the larger display matrix.

12. The electronic computer device of claim 1, further comprising one or more securing mechanisms that physically secure one or more edges of the first display to one or more edges of the additional displays.

13. An system comprising:
   a first electronic computer device and one or more additional electronic computing devices, the first electronic computer device comprising
      a first display configured to combine with one or more additional displays of one or more additional electronic devices to form a larger display from a matrix of the first display and the plurality of additional displays; and
      a display orientation module that automatically determines an orientation of the first display with respect to the one or more additional displays that form the larger display matrix and adjusts an orientation of the larger display matrix relative to a user in response to user input through a software application designed for joint operation by multiple users, the display orientation module determining a location of the first display in the larger display matrix;
   a control module that
      communicates with one or more of the additional electronic computer devices to control operation of the larger display matrix; and
      transfers control of the larger display matrix from a first electronic computer device serving as a display master to a second electronic computer device in response to an input command, the second electronic computer device becoming the display master.

14. The system of claim 13, wherein the first electronic computer device comprises a slate computer.

15. A computer implemented method comprising:
   configuring a first display of an electronic computer device to combine with one or more additional displays of one or more additional electronic computer devices to form a larger display matrix, the first display configured to provide a portion of the larger display matrix; and
   automatically determining an orientation of the first display with respect to the one or more additional displays that form the larger display matrix and adjusting an orientation of the larger display matrix relative to a user in response to user input through a software application designed for joint operation by multiple users, the display orientation module determining a location of the first display in the larger display matrix;
   identifying an electronic computer device as a display master, wherein the display master is the electronic computer device that controls the output of the larger display matrix, the display master sending output display signals to each of the other electronic computer devices; and
   transferring control of the output of the larger display matrix to a second electronic computer device in response to an input command, the second electronic computer device becoming the display master.

16. The method of claim 15, further comprising:
   operating the larger display matrix based on the output display signals from the display master.

17. The electronic computer device of claim 4, wherein the display orientation module determines an orientation of the first display with respect to one or more of the additional displays based on information determined by the detection contact points.

* * * * *